(12) United States Patent
Mizuno

(10) Patent No.: US 9,048,511 B2
(45) Date of Patent: Jun. 2, 2015

(54) AIR ELECTRODE FOR METAL-AIR BATTERY AND METAL-AIR BATTERY PROVIDED WITH SAME

(75) Inventor: Fuminori Mizuno, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/581,383

(22) PCT Filed: Aug. 3, 2011

(86) PCT No.: PCT/IB2011/001802
§ 371 (c)(1),
(2), (4) Date: Aug. 27, 2012

(87) PCT Pub. No.: WO2012/023013
PCT Pub. Date: Feb. 23, 2012

(65) Prior Publication Data
US 2013/0143132 A1   Jun. 6, 2013

(30) Foreign Application Priority Data

Aug. 17, 2010  (JP) ................................ 2010-182093

(51) Int. Cl.
| | |
|---|---|
| *H01M 4/36* | (2006.01) |
| *H01M 12/08* | (2006.01) |
| *H01M 4/86* | (2006.01) |
| *H01M 4/90* | (2006.01) |
| *H01M 12/06* | (2006.01) |

(52) U.S. Cl.
CPC ............ *H01M 12/08* (2013.01); *H01M 4/8615* (2013.01); *H01M 4/9016* (2013.01); *H01M 12/06* (2013.01); *Y02E 60/50* (2013.01)

(58) Field of Classification Search
CPC .. C01P 2002/22; Y02E 60/128; H01M 12/06; H01M 12/08; H01M 4/9016
See application file for complete search history.

(56) References Cited

U.S. PATENT DOCUMENTS

| | | | |
|---|---|---|---|
| 5,356,728 A | 10/1994 | Balachandran et al. | |
| 6,127,061 A * | 10/2000 | Shun et al. | 429/406 |
| 2002/0015871 A1* | 2/2002 | Tao et al. | 429/27 |
| 2004/0137310 A1* | 7/2004 | Kiros | 429/42 |
| 2007/0141431 A1* | 6/2007 | Wang et al. | 429/34 |
| 2009/0290287 A1* | 11/2009 | Lipka et al. | 361/502 |
| 2011/0027666 A1 | 2/2011 | Burchardt et al. | |
| 2011/0183201 A1 | 7/2011 | Genin et al. | |
| 2013/0095323 A1* | 4/2013 | Grafov et al. | 428/402.24 |

(Continued)

FOREIGN PATENT DOCUMENTS

| | | |
|---|---|---|
| CN | 1338125 A | 2/2002 |
| CN | 102792500 A | 11/2012 |

(Continued)

OTHER PUBLICATIONS

English machine translation of Okumi JP2010-113889 May 2010.*

(Continued)

*Primary Examiner* — Ula C Ruddock
*Assistant Examiner* — Lisa S Park Gehrke
(74) *Attorney, Agent, or Firm* — Oliff PLC

(57) ABSTRACT

An air electrode for a metal-air battery includes an air electrode catalyst and an electrically conductive material, and the air electrode catalyst contains a layered double hydroxide. Discharge capacity can be improved by incorporating the air electrode of this invention in a metal-air battery.

12 Claims, 1 Drawing Sheet

(56) References Cited

U.S. PATENT DOCUMENTS

2013/0143132 A1 6/2013 Mizuno
2013/0273442 A1* 10/2013 Ogumi et al. .................. 429/405

FOREIGN PATENT DOCUMENTS

| JP | A-2009-283381 | | 12/2009 |
|----|----|----|----|
| JP | 2010-113889 | * | 5/2010 |
| JP | A-2010-108904 | | 5/2010 |
| JP | A-2010-113889 | | 5/2010 |
| WO | WO 00/44057 A1 | | 7/2000 |
| WO | WO 2010/012951 A2 | | 2/2010 |
| WO | WO 2012/023013 A1 | | 2/2012 |

OTHER PUBLICATIONS

Naoko Fujiwara, "Development of Reversible Air Electrode for Metal-Air Secondary Battery," Electrochemistry, Jun. 5, 2010, vol. 78, No. 6, pp. 540-544.

J. Katana et al., "Characterization and Electrocatalytic Behavior of Layered Li2MnO3 and Its Acid-Treated Form," Chemistry of Materials, 2007, vol. 19, pp. 229-234.

Notification of Reason(s) for Refusal issued in Japanese Patent Application No. 2010-182093 (with partial English-language translation) mailing date Aug. 21, 2012.

International Search Report issued in International Application No. PCT/IB2011/001802 dated Dec. 20, 2011.

Written Opinion of the International Searching Authority issued in International Application No. PCT/IB2011/001802 dated Dec. 20, 2011.

Nobuo IYI et al., *A Novel Synthetic Route to Layered Double Hydroxides Using Hexamethylenetetramine*, The Chemical Society of Japan, Chemistry Letters, vol. 33, No. 9 (2004), pp. 1122-1123.

Jan. 14, 2015 Office Action issued in U.S. Appl. No. 13/881,931.

Liao, Chien-Shiun, et al., "Structure and Conductive Properties of Poly (ethylene oxide)/Layered Double Hydroxide Nanocomposite Polymer Electrolytes," Electrochimica Acta, vol. 49, pp. 4993-4998, 2004.

Liu, Zhaoping et al., "Synthesis Anion Exchange, and Delamination of Co-Al Layered Double Hydroxide: Assembly of the Exfoliated Nano-sheet/Polyanion Composite Films and Magneto-Optical Studies," J. Am. Chem. Soc., pp. 4872-4880, 2006.

Leroux, Fabrice, et al., "Polymer Interleaved Layered Double Hydroxide: A New Emerging Class of Nanocomposites," Chem. Mater., pp. 3507-3515, 2001.

\* cited by examiner

AIR ELECTRODE FOR METAL-AIR BATTERY AND METAL-AIR BATTERY PROVIDED WITH SAME

BACKGROUND OF THE INVENTION

1. Field of the Invention

The invention relates to an air electrode for a metal-air battery capable of improving discharge capacity by being incorporated in a metal-air battery, and to a metal-air battery provided with this air electrode.

2. Description of Related Art

Metal-air batteries are rechargeable batteries that use an elemental metal or metal compound for the negative electrode active material and oxygen for the positive electrode active material. Since oxygen to be utilized as the positive electrode active material is obtained from the air, the necessity to seal the positive electrode active material in such batteries does not arise. This allows theoretically the metal-air batteries to be provided with greater capacity than secondary batteries that use a solid positive electrode active material.

In a lithium-air battery, which is a type of metal-air battery, the reaction of the following formula (I) proceeds at the negative electrode during discharge.

$$2Li \rightarrow 2Li^+ + 2e^- \quad (I)$$

Electrons, generated in formula (I) and output to an external circuit, perform work in an external load, after which they reach the air electrode. Lithium ions ($Li^+$) generated in formula (I) migrate within an electrolyte retained between the negative electrode and the air electrode from the negative electrode side to the air electrode side by electroosmosis.

In addition, the reactions of the following formulas (II) and (III) proceed at the air electrode during discharge.

$$2Li^+ + O_2 + 2e^- \rightarrow Li_2O_2 \quad (II)$$

$$2Li^+ + \tfrac{1}{2}O_2 + 2e^- \rightarrow Li_2O \quad (III)$$

The lithium peroxide ($Li_2O_2$) and lithium oxide ($LiO_2$) generated accumulate on the air electrode as a solid. During charging, the reverse reaction of formula (I) proceeds at the negative electrode, while the reverse reactions of formulas (II) and (III) proceed at the air electrode, thereby causing metal lithium to be regenerated at the negative electrode and enabling recharging.

Considerable research has been conducted in recent years on metal-air batteries using alkaline metal elements, including lithium, for the negative electrode active material. Japanese Patent Application Publication No. 2010-108904 (JP-A-2010-108904) discloses a metal-air battery having a negative electrode, which has a negative electrode layer containing a negative electrode active material having an alkaline metal element, and a negative electrode current collector that carries out current collection of the negative electrode layer, an air electrode, which has an air electrode layer containing an electrically conductive material, and an air electrode current collector that carries out current collection of the air electrode layer, and an electrolyte that conducts metal ions between the negative electrode and the air electrode, wherein the air electrode current collector is composed of a carbon material or a highly electron-conducting ceramic material.

An experimental example (Example 1) is described in JP-A 2010-108904 in which manganese dioxide ($MnO_2$) is used for the air electrode. However, as indicated in the subsequently described examples, as a result of studies conducted by the inventors of the application, $MnO_2$ was determined to have a small number of active sites on a catalyst.

SUMMARY OF THE INVENTION

The invention provides an air electrode for a metal-air battery capable of improving discharge capacity by being incorporated in a metal-air battery, and a metal-air battery provided with this air electrode.

A first aspect of the invention is an air electrode for a metal-air battery that contains an air electrode catalyst and an electrically conductive material, wherein the air electrode catalyst contains a layered double hydroxide.

In the air electrode for a metal-air battery of the invention, the layer that composes the layered double hydroxide may be oriented in a plane{003}.

In the air electrode for a metal-air battery of the invention, the layered double hydroxide may be provided with a positively charged cation layer and a negatively charged anion layer, and the cation layer may include at least two or more types of metal cations composed of mutually difference valences.

In the air electrode for a metal-air battery of the invention, the anion layer may contain hydrated water.

In the air electrode for a metal-air battery of the invention, the anion layer may contain an anion selected from the group consisting of a fluoride ion ($F^-$), chloride ion ($Cl^-$), bromide ion ($Br^-$), iodide ion ($I^-$), carbonate ion ($CO_3^{2-}$), sulfate ion ($SO_4^{2-}$), nitrate ion ($NO_3^-$), hydroxide ion ($OH^-$) and carboxylate ion ($R—CO_2^{3 1}$: wherein, R represents a substituent selected from the group consisting of alkyl groups having 1 to 5 carbon atoms).

In the air electrode for a metal-air battery of the invention, examples of the composition of the layered double hydroxide include compositions represented by the following formula (1):

$$[M^{2+}_{1-x}M^{3+}_x(OH)_2][A^{n-}_{x/n} \cdot yH_2O] \quad (1)$$

(where, $M^{2+}$ represents a divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$, $M^{3+}$ represents a trivalent metal ion selected from the group consisting of $Al^{3+}$, $Cr^{3+}$, $Fe^{3+}$, $Co^{3+}$ and $In^{30}$, $A^{n-}$ represents an n-valence anion selected from the group consisting of $F^-$, $Cl^-$, $Br^-$, $I^-$, $CO_3^{2-}$, $SO_4^{2-}$, $NO_3^-$, $OH^-$ and $R—CO_2^-$, R represents a substituent selected from the group consisting of alkyl groups having 1 to 5 carbon atoms, $0<x<1$, and y is a real number greater than zero).

The metal-air battery according to a second aspect of the invention is a metal-air battery at least provided with an air electrode, a negative electrode, and an electrolyte interposed between the air electrode and the negative electrode, wherein the air electrode is the air electrode for a metal-air battery according to the first aspect of the invention.

According to the invention, the use of a layered double hydroxide for the air electrode catalyst makes it possible to improve the amount of reduced oxygen and demonstrate high discharge capacity.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
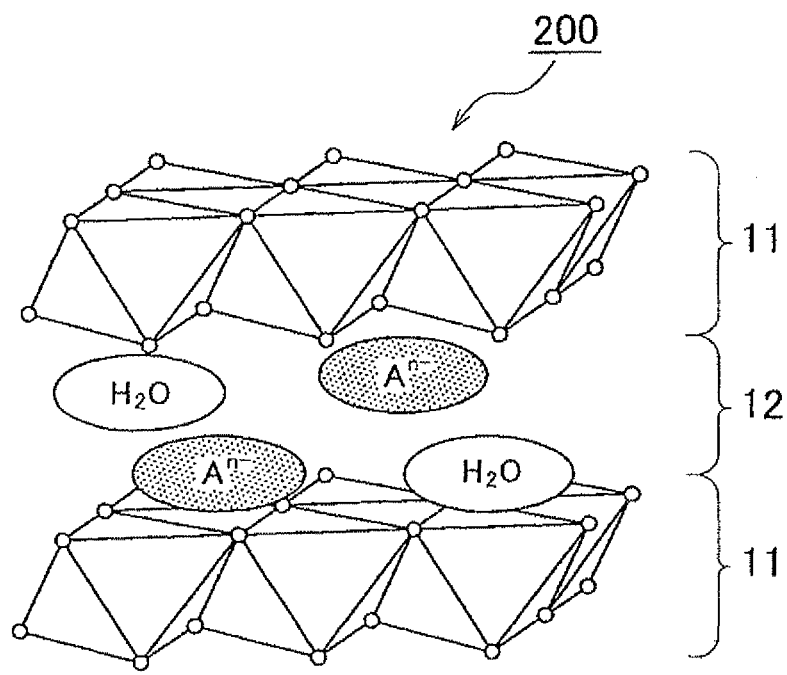
FIG. 1 is a schematic drawing of the layer configuration of a layered double hydroxide used in the invention.

The air electrode for a metal-air battery of the invention is an air electrode for a metal-air battery that contains an air electrode catalyst and an electrically conductive material, and the air electrode catalyst contains a layered double hydroxide.

In the invention, a double hydroxide refers to a higher order compound formed by compounding two types of metal hydroxides (or three types of metal hydroxides or more). In addition, in the invention, a layered double hydroxide refers to a plate-like crystal in which a double hydroxide is regularly oriented and has two-dimensional expansion, and the plate-like crystal is laminated in two or more layers.

The layer that composes the layered double hydroxide used in the invention is preferably oriented in a fixed direction since the edges of the layer are able to serve as reduced oxygen adsorption sites. The layered double hydroxide used in the invention is more preferably oriented in the {003} plane. This is because there are many layered structures, including layered double hydroxides, that are typically oriented in the {003} plane, and in a layered structure oriented in the {003} plane, adsorption sites are continuously formed at regular intervals. Furthermore, in the description, nomenclature used to describe crystal planes is such that parentheses are used to represent groups of equivalent planes. For example, the (003) plane, (030) plane, (300) plane, (00*) plane, (0*0) plane and (*00) plane (in the above nomenclature, numbers represented by asterisks (*) refer to "3 tilde") all denote the {003} plane.

The layered double hydroxide used in the invention is provided with a positively charged cation layer (hydroxide base layer) and a negatively charged anion layer (intermediate layer), and the cation layer preferably contains at least two or more types of metal cations composed of mutually different valences. Among these, the anion layer preferably contains hydrated water. In addition, the anion layer preferably contains an anion selected from the group consisting of fluoride ion ($F^-$), chloride ion ($Cl^-$), bromide ion ($Br^-$), iodide ion ($I^-$), carbonate ion ($CO_3^{2-}$), sulfate ion ($SO_4^{2-}$), nitrate ion ($NO_3^-$), hydroxide ion ($OH^-$) and carboxylate ion ($R-CO_2^-$: wherein, R represents a substituent selected from the group consisting of alkyl groups having 1 to 5 carbon atoms).

An example of a configuration of the layered double hydroxide that satisfies all the above conditions includes the configuration represented by the following formula (1):

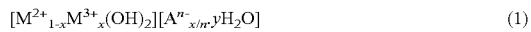
(1)

(wherein, $M^{2+}$ represents a divalent metal ion selected from the group consisting of $Mg^{2+}$, $Mn^{2+}$, $Fe^{2+}$, $Co^{2+}$, $Ni^{2+}$, $Cu^{2+}$ and $Zn^{2+}$, $M^{3+}$ represents a trivalent metal ion selected from the group consisting of $Al^{3+}$, $Cr^{3+}$, $Fe^{3+}$, $Co^{3+}$ and $In^{3+}$, $A^{n-}$ represents an n-valence anion selected from the group consisting of $F^-$, $Cl^-$, $Br^-$, $I^-$, $CO_3^{2-}$, $SO_4^{2-}$, $NO_3^-$, $OH^-$ and $R-CO_2^-$, R represents a substituent selected from the group consisting of alkyl groups having 1 to 5 carbon atoms, $0<x<1$, and y is a real number greater than zero). Layered double hydroxides have a layered structure, and have the property of incorporating anions between the layers (so-called intercalation). Within this layered structure, the cation layer has a positive charge as a result of substituting (putting into solid solution) trivalent metal ions for a portion of the divalent metal ions, and functions to maintain electrical neutrality by incorporating anions into the anion layer in order to compensate for that charge.

Furthermore, although an example has been given of a layered double hydroxide having one type each of a divalent metal ion and a trivalent metal ion, the layered double hydroxide used in the invention is not necessarily limited thereto, but rather, for example, the layered double hydroxide may be a layered double hydroxide having one type each of a univalent metal ion and a divalent metal ion, or one type of divalent metal ion and two types of tetravalent metal ions. Namely, a layered double hydroxide can be used for the layered double hydroxide of the invention provided it has one type or more each of metal ions having mutually different valences. Furthermore, metal ions of the same metal element may be contained provided they have mutually different valences.

The layered double hydroxide used in the invention can be produced by a conventional process such as a co-precipitation process or sol-gel process. A layered double hydroxide produced according to a process as described above, although varying among individual materials, typically has a mean particle diameter on the order of 0.1 μm to several μm, and the interval between layers is on the nanometer (nm) order.

Specific examples of the layered double hydroxide used in the invention include nickel-aluminum double hydroxides having the configuration represented by the following formula (2), and magnesium-aluminum double hydroxides having the configuration represented by the following formula (3):

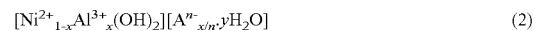
(2)

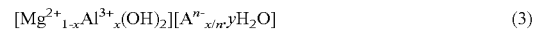
(3)

(wherein, $A^{n-}$ represents an n-valence anion selected from the group consisting of $F^-$, $Cl^-$, $Br^-$, $I^-$, $CO_3^{2-}$, $SO_4^{2-}$, $NO_3^-$, $OH^-$ and $R-CO_2^-$, R represents a substituent selected from the group consisting of alkyl groups having 1 to 5 carbon atoms, $0<x<1$, and y is a real number greater than zero). Furthermore, other examples of layered double hydroxides include lithium (monovalent)-aluminum (trivalent) double hydroxide, cobalt (divalent)-iron (trivalent) double hydroxide, and nickel (divalent)-iron (trivalent) double hydroxide.

FIG. 1 is a drawing schematically showing the layer configuration of a layered double hydroxide used in the invention, and shows two cation layers and an anion layer between the cation layers in the layer configuration. A cation layer 11 of a layered double hydroxide 200 has a composition represented by $[M^{2+}_{1-x}M^{3+}_x(OH)_2]$ in the previously described formula (1), and as can be understood from the drawing, has a regular octahedral crystal structure. On the other hand, an anion layer 12 of the layered double hydroxide 200 has a composition represented by $[A^{n-}_{x/n}\cdot yH_2O]$ of the formula (1). Since the anion layer is highly hydrophilic, it contains water molecules in an amount corresponding to drying conditions. Since the edges (ends) of the cation layer 11 are easily adsorbed by reduced oxygen, the activity of the reduced oxygen can be improved in an oxygen-reduction reaction field. Thus, the use of a layered double hydroxide in an air electrode catalyst makes it possible to dramatically improve discharge capacity of a metal-air battery.

The air electrode for a metal-air battery according to the invention is preferably provided with an air electrode layer, and normally in addition thereto, the air electrode is provided with an air electrode current collector and an air electrode lead connected to the air electrode current collector.

The air electrode layer of the air electrode for a metal-air battery according to the invention at least contains the previously described layered double hydroxide and an electrically conductive material. Moreover, it may also contain a binder as necessary.

The above-mentioned layered double hydroxide may be used alone as an air electrode catalyst, or may be used as an air electrode catalyst as a mixture with another oxygen reduction catalyst. Examples of other oxygen reduction catalysts include members of the platinum family such as nickel, palladium or platinum, precious metals such as silver or gold, perovskite type oxides containing a transition metal such as cobalt, manganese or iron, inorganic compounds containing oxides of precious metals such as, ruthenium, iridium or palladium, metal-coordinated organic compounds having a porphyrin backbone or phthalocyanine backbone, inorganic ceramics such as manganese dioxide ($MnO_2$) or cerium oxide ($CeO_2$), and composite materials consisting of a mixture of these materials. The content ratio of the air electrode catalyst in the air electrode layer is preferably 1% by weight to 90% by weight and more preferably 5% by weight to 80% by weight based on a value of 100% by weight for the weight of the entire air electrode layer. If the content ratio of the air electrode catalyst is excessively low, there is the risk of being unable to demonstrate adequate catalytic function, while if the content ratio of the air electrode catalyst is excessively high, the relative content ratio of the electrically conductive material decreases, thereby resulting in a decrease in the reaction field and the risk of causing a decrease in battery capacity. From the viewpoint of allowing the electrode reactions to proceed more smoothly, the catalysts are preferably supported on an electrically conductive material to be subsequently described.

Although there are no particular limitations on the electrically conductive material used in the previously described air electrode layer provided it has electrical conductivity, examples include carbon materials, perovskite electrically conductive materials, porous electrically conductive polymers and metal porous bodies. In particular, although carbon materials may or may not have a porous structure, carbon materials preferably have a porous structure in the invention. This is because the use of a porous structure results in greater specific surface area, thereby making it possible to provide numerous reaction fields. A specific example of a carbon material having a porous structure is mesoporous carbon. On the other hand, specific examples of carbon materials not having a porous structure include carbon materials having a high specific surface area such as graphite, acetylene black, carbon nanotubes, carbon fibers and active carbon. The content ratio of the electrically conductive material in the air electrode layer is preferably 10% by weight to 99% by weight and more preferably 20% by weight to 95% by weight based on a value of 100% by weight for the weight of the entire air electrode layer. If the content ratio of the electrically conductive material is excessively low, the number of reaction fields decrease thereby resulting the possibility of a decrease in battery capacity, while if the content ratio of the electrically conductive material is excessively high, this results in a relative decrease in the catalyst content, thereby resulting in the possibility of being unable to demonstrate adequate catalytic function.

Although the previously described air electrode layer at least contains an air electrode catalyst and an electrically conductive material, it preferably further contains a binder that immobilizes the electrically conductive material. Examples of binders include rubber-based resins such as polyvinylidene fluoride (PVdF), polytetrafluoroethylene (PTFE) or styrene-butadiene rubber (SBR). Although there are no particular limitations thereon, the content ratio of the binder in the air electrode layer is preferably 40% by weight or less and more preferably 1% by weight to 30% by weight based on a value of 100% by weight for the weight of the entire air electrode layer.

The air electrode layer is formed by coating an air electrode mixture consisting of an air electrode catalyst, an electrically conductive material, and a binder onto a support such as an air electrode current collector to be subsequently described. A solvent may be used to prepare the air electrode mixture. A solvent having a boiling point of 200° C. or lower is preferable for the solvent used to prepare the air electrode mixture, and examples of solvents that can be used include acetone, N,N-dimethylformamide (DMF) and N-methyl-2-pyrrolidone (NMP).

Although varying according to the application and the like of the air battery, the thickness of the air electrode layer is, for example, within the range of 2 µm to 500 µm, and is preferably within the range of 5 µm to 300 µm.

The air electrode current collector in the air electrode for a metal-air battery according to the invention carries out current collection of the air electrode layer. Although there are no particular limitations on the material of the air electrode current collector provided it has electrical conductivity, examples of materials include stainless steel, nickel, aluminum, iron, titanium and carbon. Examples of air electrode current collectors include foil-like current collectors, plate-like current collectors, porous current collectors, fibrous current collectors, non-woven fabric current collectors and mesh (grid)-like current collectors. In the invention in particular, carbon paper and mesh-like current collectors are preferable from the viewpoint of having superior current collection efficiency. Among these, in the case of using a mesh-like current collector, a mesh-like air electrode current collector is normally arranged inside the air electrode layer. Moreover, the air electrode for a metal-air battery according to the invention may also have another air electrode current collector (such as a foil-like current collector) that collects charge accumulated by the mesh-like air electrode current collector. In addition, in the invention, a battery case to be subsequently described may also be provided with the function of an air electrode current collector. The thickness of the air electrode current collector is, for example, preferably within the range of 10 µm to 1000 µm and particularly preferably within the range of 20 µm to 400 µm.

The metal-air battery of the invention is a metal-air battery at least provided with an air electrode, a negative electrode, and an electrolyte interposed between the air electrode and the negative electrode, and the air electrode is the previously described air electrode for a metal-air battery.

Figure 2:
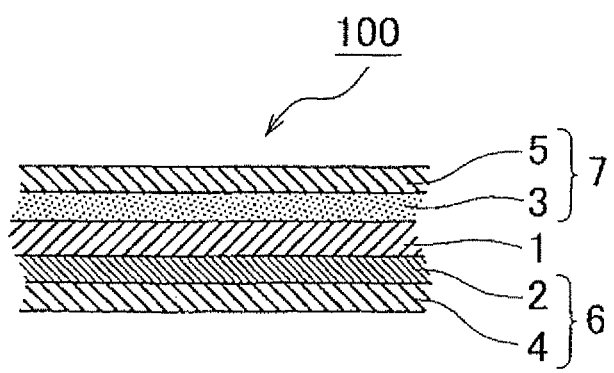
FIG. 2 is a drawing schematically showing a cross-sectional view sectioned in the direction of lamination of an example of the layer configuration of a metal-air battery according to the invention.

FIG. 2 is a drawing schematically showing a cross-sectional view sectioned in the direction of lamination of an example of the layer configuration of a metal-air battery according to the invention. Furthermore, the metal-air battery according to the invention is not necessarily limited to this example. A metal-air battery 100 has an air electrode 6 provided with an air electrode layer 2 and an air electrode current collector 4, a negative electrode 7 provided with a negative electrode active material layer 3 and a negative electrode current collector 5, and an electrolyte 1 positioned between the air electrode 6 and the negative electrode 7. The air electrode of the metal-air battery according to the invention is the same as previously described. The following provides a detailed explanation of constituents of the metal-air battery according to the invention consisting of the negative electrode, electrolyte, separator and battery case.

The negative electrode in the metal-air battery according to the invention preferably has a negative electrode layer containing a negative electrode active material, and normally additionally has a negative electrode current collector and a negative electrode lead connected to the negative electrode current collector.

The negative electrode layer in the metal-air battery according to the invention contains a negative electrode active material containing a metal and an alloy material. Specific examples of metals and alloy materials that can be used in the negative electrode active material include alkaline metals such as lithium, sodium or potassium, group 2 elements such as magnesium or calcium, group 13 elements such as aluminum, transition metals such as zinc or iron, and alloy materials and compounds containing these metals. Examples of alloys containing elemental lithium include lithium-aluminum alloys, lithium-tin alloys, lithium-lead alloys and lithium-silicon alloys. In addition, examples of metal oxides containing elemental lithium include lithium titanium oxide. In addition, examples of metal nitrides containing elemental lithium include lithium cobalt nitride, lithium iron nitride and lithium manganese nitride. In addition, lithium coated with a solid electrolyte can also be used in the negative electrode.

In addition, the negative electrode layer may contain only a negative electrode active material, or may contain at least one of an electrically conductive material and binder in addition to the negative electrode active material. For example, in the case the negative electrode active material is in the form of a foil, the negative electrode layer can be that which only contains a negative electrode active material. On the other hand, in the case the negative electrode active material is in the form of a powder, the negative electrode layer can be that which contains the negative electrode active material and a binder. Furthermore, an explanation of the electrically conductive material and the binder is omitted here since they are the same as those previously described in the section describing the air electrode.

Although there are no particular limitations on the material of the negative electrode current collector in the metal-air battery according to the invention provided it is electrically conductive, examples of materials include copper, stainless steel, nickel and carbon. Examples of the form of the negative electrode current collector include foil, plate and mesh (grid) forms. In the invention, the battery case to be subsequently described may also be provided with the function of a negative electrode current collector.

The electrolyte in the metal-air battery according to the invention is retained between the air electrode layer and the negative electrode layer, and has the function of exchanging metal ions between the air electrode layer and the negative electrode layer. An aqueous electrode or a non-aqueous electrode can be used for the electrolyte.

A non-aqueous electrolyte solution or a non-aqueous gel electrolyte can be used for the non-aqueous electrolyte. The type of non-aqueous electrolyte solution is preferably suitably selected corresponding to the type of metal ions conducted. For example, a non-aqueous electrolyte solution of a lithium air battery normally contains a lithium salt and a non-aqueous solvent. Examples of the lithium salt include inorganic lithium salts such as $LiPF_6$, $LiBF_4$, $LiClO_4$ and $LiAsF_6$, and organic lithium salts such as $LiCF_3SO_3$, $LiN(SO_2CF_3)_2$(Li-TFSI), $LiN(SO_2C_2F_5)_2$ and $LiC(SO_2CF_3)_3$. Examples of non-aqueous solvents include ethylene carbonate (EC), propylene carbonate (PC), dimethyl carbonate (DMC), diethyl carbonate (DEC), ethylmethyl carbonate (EMC), ethyl carbonate, butylene carbonate, γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof. In addition, the non-aqueous solvent preferably is a solvent having high oxygen solubility from the viewpoint of being able to efficiently use dissolved oxygen in the reaction. The concentration of lithium salt in the non-aqueous electrolyte solution is, for example, within the range of 0.5 mol/L to 3 mol/L. Furthermore, in the invention, a lowly volatile liquid such as an ionic liquid may be used for the non-aqueous electrolyte solution or non-aqueous solvent, typical examples of which include N-methyl-N-propylpiperidinium bis(trifluoromethanesulfonyl) imide (PP13TFSI), N-methyl-N-propylpyrrolidinium bis(trifluoromethanesulfonyl) imide (P13TFSI), N-butyl-N-methylpyrrolidinium bis(trifluoromethanesulfonyl) imide (P14TFSI), N,N-diethyl-N-methyl-N-(2-methoxyethyl) ammonium bis(trifluoromethanesulfonyl) imide (DEMETFSI), and N,N,N-trimethyl-N-propylammonium bis(trifluoromethanesulfonyl) imide (TMPATFSI). Among the above-mentioned non-aqueous solvents, an electrolyte solvent that is stable with respect to oxygen radicals is more preferable since it allows the oxygen reduction reaction represented by the above-mentioned formula (II) or formula (III) to proceed. Examples of such non-aqueous solvents include AcN, DME, DMSO, N-methyl-N-propylpiperidinium bis(trifluoromethanesulfonyl) imide (PP13TFSI), N-methyl-N-propylpyrrolidinium bis(trifluoromethanesulfonyl) imide (P13TFSI) and N-butyl-N-methylpyrrolidinium bis(trifluoromethanesulfonyl) imide (P14TFSI).

In addition, the non-aqueous gel electrolyte used in the invention is normally obtained by adding a polymer to a non-aqueous electrolyte solution and gelling. For example, a non-aqueous gel electrolyte of a lithium air battery can be obtained by adding a polymer such as polyethylene oxide (PEO), polyacrylonitrile (PAN), or polymethyl methacrylate (PMMA) to the previously described non-aqueous electrolyte solution followed by gelling. In the invention, an LiTFSI $(LiN(CF_3SO_2)_2)$-PEO-based non-aqueous gel electrolyte is preferable.

An aqueous electrolyte solution containing a lithium salt in water is normally used for the aqueous electrolyte solution used in a metal-air battery, and particularly a lithium air battery. Examples of lithium salts include LiOH, LiCl, $LiNO_3$ and $CH_3CO_2Li$.

A solid electrolyte can additionally be used by mixing into the above-mentioned aqueous electrolyte or non-aqueous electrolyte. Examples of solid electrolytes that can be used include Li—La—Ti—O-based solid electrolytes (perovskite types), LATP-based solid electrolytes (NASICON types), and Li—La—Zr—O-based solid electrolytes (garnet types).

The battery according to the invention preferably has a separator between the air electrode and the negative electrode. Examples of the separator include porous films made of polyethylene or polypropylene, and non-woven fabrics such as a resin non-woven fabric or glass fiber non-woven fabric. These materials used for the separator can also be used as an electrolyte support by being impregnated with an electrolyte as described above.

The metal-air battery according to the invention normally has a battery case that houses the air electrode, negative electrode, electrolyte and the like. Specific examples of the shape of the battery case include a coin shape, flat shape, cylindrical shape and laminated shape. The battery case may be a battery case that is open to the atmosphere or a sealed battery case. A battery case that is open to the atmosphere is a battery case having a structure that at least allows the air electrode layer to adequately contact the atmosphere. On the other hand, in the case the battery case is a sealed battery case, a gas (air) introduction tube and venting tube are preferably provided in the sealed battery case. In this case, the gas that is introduced and vented preferably has a high oxygen concentration, and is more preferably pure oxygen. In addition, the oxygen concentration is preferably increased during discharging and decreased during charging.

Metal-air batteries were produced consisting of Example 1 and Comparative Examples 1 to 5. [$Ni^{2+}_{0.75}Al^{3+}_{0.25}(OH)_2$] [$CO3^{2-}_{0.25/2} \cdot yH_2O$] (wherein, y is a real number greater than zero) was prepared for use as an air electrode catalyst, carbon black having a specific surface area of 60 $m^2/g$ was prepared for use as an electrically conductive material, and PTFE was prepared for use as a binder. These materials were then mixed so that the ratio of electrically conductive material:air electrode catalyst:binder was 80% by weight: 10% by weight: 10% by weight to prepare an air electrode mixture.

A mesh made of SUS304 was prepared for use as a current collector. The air electrode mixture was attached to the current collector to produce an air electrode. In addition, lithium metal was laminated onto the current collector to produce a negative electrode. Lithium bis(trifluoromethanesulfonyl) imide was dissolved in N-methyl-N-propylpyrrolidinium bis (trifluoromethanesulfonyl) imide to a concentration of 0.32 mol/kg to prepare an electrolyte solution. The electrolyte solution was then impregnated into a polypropylene non-woven fabric to prepare an electrolyte layer. The electrolyte layer was positioned between the air electrode and the negative electrode so as to obtain a configuration consisting of current collector, metal lithium, electrolyte layer, air electrode mixture and current collector in that order to produce the metal-air battery of Example 1. All of the above steps were carried out in a glove box containing a nitrogen atmosphere.

The metal-air battery of Comparative Example 1 was produced in the same manner as Example 1 with the exception of preparing the air electrode mixture by mixing the electrically conductive material and the binder at a ratio of 90% by weight to 10% by weight without using the air electrode catalyst in the preparation process of the air electrode mixture of Example 1.

The metal-air battery of Comparative Example 2 was produced in the same manner as Example 1 with the exception of using a polycrystalline powder of $MnO_2$ for the air electrode catalyst instead of [$Ni^{2+}_{0.75}Al^{3+}_{0.25}(OH)_2$] [$CO_3^{2-}_{0.25/2} \cdot yH_2O$] in the preparation process of the air electrode mixture of Example 1.

The metal-air battery of Comparative Example 3 was produced in the same manner as Example 1 with the exception of using a polycrystalline powder of $La_{0.6}Sr_{0.4}CoO_3$ for the air electrode catalyst instead of [$Ni^{2+}_{0.75}Al^{3+}_{0.25}(OH)_2$] [$CO_3^{2-}_{0.25/2} \cdot yH_2O$] in the preparation process of the air electrode mixture of Example 1.

The metal-air battery of Comparative Example 4 was produced in the same manner as Example 1 with the exception of using a polycrystalline powder of $LiCoO_2$ having a {003} plane for the air electrode catalyst instead of [$Ni^{2+}_{0.75}Al^{3+}_{0.25}(OH)_2$] [$CO_3^{2-}_{0.25/2} \cdot yH_2O$] in the preparation process of the air electrode mixture of Example 1.

The metal-air battery of Comparative Example 5 was produced in the same manner as Example 1 with the exception of using vapor grown carbon fibers (VGCF) having a {002} plane for the air electrode catalyst instead of [$Ni^{2+}_{0.75}Al^{3+}_{0.25}(OH)_2$] [$CO_3^{2-}_{0.25/2} \cdot yH_2O$] in the preparation process of the air electrode mixture of Example 1.

The metal-air batteries of Example 1 and Comparative Examples 1 to 5 were measured for constant-current charging and discharging at 0.02 $mA/cm^2$ and 60° C. followed by determination of initial discharge capacity per electrode weight. The following Table 1 summarizes the initial discharge capacities of the metal-air batteries of Example 1 and Comparative Examples 1 to 5.

TABLE 1

|  | Initial Discharge Capacity (mAh/g-electrode) |
| --- | --- |
| Example 1 | 258 |
| Comparative Example 1 | 116 |
| Comparative Example 2 | 158 |
| Comparative Example 3 | 145 |
| Comparative Example 4 | 138 |
| Comparative Example 5 | 161 |

Since an air electrode catalyst was not used in the metal-air battery of Comparative Example 1, initial discharge capacity was only 116 mAh/g, making it the lowest initial discharge capacity among the metal-air batteries of Example 1 and Comparative Examples 1 to 5. Since the ability to adsorb $O_2$ onto the surface of the air electrode catalyst was low for all of the metal-air batteries of Comparative Examples 2 to 5, the initial discharge capacities were low at 161 mAh/g or less.

In contrast to Comparative Examples 1 to 5, the metal-air battery of Example 1, in which [$Ni^{2+}_{0.75}Al^{3+}_{0.25}(OH)_2$] [$CO3^{2-}_{0.25/2} \cdot yH_2O$] was used for the air electrode catalyst, demonstrated an initial discharge capacity of 258 mAh/g, which was considerably higher than the initial discharge capacities of the metal-air batteries of Comparative Examples 1 to 5. This is thought to be the result of the [$Ni^{2+}_{0.75}Al^{3+}_{0.25}(OH)_2$] [$CO_3^{2-}_{0.25/2} \cdot yH_2O$] being oriented in the {003} plane, the lamination of a positively charged cation layer and an anion layer containing hydrated water, and adsorption sites for reduced oxygen being formed on the ends (edges) of the laminate.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A metal-air battery comprising:
    an air electrode that includes:
        an electrically conductive material, and
        an air electrode catalyst that contains a layered double hydroxide;
    a negative electrode; and
    a non-aqueous electrolyte interposed between the air electrode and the negative electrode and in contact with the air electrode.

2. The metal-air battery according to claim 1, wherein a layer that composes the layered double hydroxide is oriented in a plane.

3. The metal-air battery according to claim 1, wherein
    the layered double hydroxide contains a positively charged cation layer and a negatively charged anion layer, and
    the cation layer contains at least two or more types of metal cations composed of mutually different valences.

4. The metal-air battery according to claim 3, wherein the anion layer contains water.

5. The metal-air battery according to claim 3, wherein the anion layer contains an anion selected from the group consisting of fluoride ion ($F^-$), chloride ion ($Cl^-$), bromide ion ($Br^-$), iodide ion ($I^-$), carbonate ion ($CO_3^{2-}$), sulfate ion ($SO_4^{2-}$), nitrate ion ($NO_3^-$), hydroxide ion ($OH^-$) and carboxylate ion (R—CO$_2^-$), where R represents a substituent selected from the group consisting of alkyl groups having 1 to 5 carbon atoms.

6. The metal-air battery according to claim 1, wherein the layered double hydroxide has a composition represented by the following formula (1):

$$[M^{2+}_{1-x}M^{3+}_x(OH)_2][A^{n-}_{x/n}\cdot yH_2O] \quad (1)$$

where
M$^{2+}$ represents a divalent metal ion selected from the group consisting of Mg$^{2+}$, Mn$^{2+}$, Fe$^{2+}$, Co$^{2+}$, Ni$^{2+}$, Cu$^{2+}$ and Zn$^{2+}$,
M$^{3+}$ represents a trivalent metal ion selected from the group consisting of Al$^{3+}$, Cr$^{3+}$, Fe$^{3+}$, Co$^{3+}$ and In$^{3+}$,
A$^{n-}$ represents an n-valence anion selected from the group consisting of F$^-$, Cl$^-$, Br$^-$, I$^-$, CO$_3^{2-}$, SO$_4^{2-}$, NO$_3^-$, OH$^-$ and R—CO$_2^-$,
R represents a substituent selected from the group consisting of alkyl groups having 1 to 5 carbon atoms, 0<x<1, and
y is a real number greater than zero.

7. The metal-air battery according to claim 1, wherein the electrode catalyst contains a perovskite oxide.

8. The metal-air battery according to claim 1, wherein the non-aqueous electrolyte is a solution comprising a solvent selected from the group consisting of ethylene carbonate, propylene carbonate, dimethyl carbonate, diethyl carbonate, ethylmethyl carbonate, ethyl carbonate, butylene carbonate, γ-butyrolactone, sulfolane, acetonitrile, dimethoxymethane, 1,2-dimethoxyethane, 1,3-dimethoxypropane, diethyl ether, tetraethylene glycol dimethyl ether, tetrahydrofuran, 2-methyltetrahydrofuran, dimethylsulfoxide, N-methyl-N-propylpiperidinium bis(trifluoromethanesulfonyl) imide, N-methyl-N-propylpyrrolidinium bis(trifluoromethanesulfonyl) imide, N-butyl-N-methylpyrrolidinium bis(trifluoromethanesulfonyl) imide, N,N-diethyl-N-methyl-N-(2-methoxyethyl) ammonium bis(trifluoromethanesulfonyl) imide and N,N,N-trimethyl-N-propylammonium bis(trifluoromethanesulfonyl) imide.

9. The metal-air battery according to claim 8, wherein the non-aqueous electrolyte solution further comprises a lithium salt selected from the group consisting of LiPF$_6$, LiBF$_4$, LiClO$_4$ LiAsF$_6$, LiCF$_3$SO$_3$, LiN(SO$_2$CF$_3$)$_2$(Li-TFSI), LiN(SO$_2$C$_2$F$_5$)$_2$ and LiC(SO$_2$CF$_3$)$_3$.

10. The metal-air battery according to claim 1, wherein the non-aqueous electrolyte is a gel obtained by adding a polymer to a non-aqueous electrolyte solution and gelling.

11. The metal-air battery according to claim 10, wherein the polymer is polyethylene oxide, polyacrylonitrile, or polymethyl methacrylate.

12. The metal-air battery according to claim 11, wherein the non-aqueous electrolyte is a LiTFSI (LiN(CF$_3$SO$_2$)$_2$)—PEO-based non-aqueous gel electrolyte.

* * * * *